United States Patent
Maev et al.

(10) Patent No.: US 12,337,419 B2
(45) Date of Patent: Jun. 24, 2025

(54) ULTRASONIC MICRO-ARRAY IMAGING SYSTEM

(71) Applicant: Tessonics Corp., Birmingham, MI (US)

(72) Inventors: Roman Gr. Maev, Windsor (CA); Andrew Ouellette, Windsor (CA); Andriy Chertov, Windsor (CA)

(73) Assignee: Tessonics Corp., Birmingham, MI (US)

( * ) Notice: Subject to any disclaimer, the term of this patent is extended or adjusted under 35 U.S.C. 154(b) by 285 days.

(21) Appl. No.: 17/873,498

(22) Filed: Jul. 26, 2022

(65) Prior Publication Data

US 2023/0029143 A1 Jan. 26, 2023

Related U.S. Application Data (60) Provisional application No. 63/226,701, filed on Jul. 28, 2021, provisional application No. 63/225,691, filed on Jul. 26, 2021.

(51) Int. Cl.
*B23K 31/12* (2006.01)
*B23K 11/30* (2006.01)
(Continued)

(52) U.S. Cl.
CPC ............ *B23K 31/125* (2013.01); *B23K 11/30* (2013.01); *G01N 29/0654* (2013.01);
(Continued)

(58) Field of Classification Search
CPC .... B23K 31/125; B23K 11/30; B23K 1/3018; B23K 11/36; B23K 11/115; G01N 291/0654; G01N 29/07; G01N 29/221; G01N 29/28; G01N 29/043; G01N 2291/0234; G01N 2291/106;
(Continued)

(56) References Cited

U.S. PATENT DOCUMENTS

| 4,472,620 | A | * | 9/1984 | Nied | B23K 35/0205 219/110 |
| 4,728,765 | A | * | 3/1988 | Prucher | B23K 35/0205 219/119 |

(Continued)

FOREIGN PATENT DOCUMENTS

| CA | 2521472 A1 * | 3/2006 | ............ B23K 11/25 |
| EP | 3144093 A1 | 3/2017 | |

(Continued)

OTHER PUBLICATIONS

International Search Report for International Application No. PCT/US22/38326 dated Dec. 6, 2022.

*Primary Examiner* — Jacques M Saint Surin
(74) *Attorney, Agent, or Firm* — Carlson, Gaskey & Olds, P.C.

(57) ABSTRACT

A spot-welding electrode assembly includes an electrode, an electrode cap at an outer end of the electrode, and a plurality of transducer elements positioned inward of the electrode cap. The transducer elements may be micro-elements. A method for monitoring a weld formed by a spot-welder includes passing current from an electrode assembly through a stack-up, transmitting an ultrasonic wave from each of a plurality of sources in the electrode assembly to a plurality of points in the stack-up, and monitoring the ultrasonic waves to monitor the weld formation.

29 Claims, 5 Drawing Sheets

(51) Int. Cl.
  *G01N 29/06* (2006.01)
  *G01N 29/07* (2006.01)
  *G01N 29/22* (2006.01)
  *G01N 29/28* (2006.01)
(52) U.S. Cl.
  CPC ............ *G01N 29/07* (2013.01); *G01N 29/221* (2013.01); *G01N 29/28* (2013.01); *G01N 2291/0234* (2013.01); *G01N 2291/0289* (2013.01); *G01N 2291/106* (2013.01); *G01N 2291/2672* (2013.01)
(58) Field of Classification Search
  CPC ..... G01N 2291/2672; G01N 2291/105; G01N 2291/0289; B06B 1/0622
  USPC .......................................................... 73/588
  See application file for complete search history.

(56) References Cited

U.S. PATENT DOCUMENTS

| | | | |
|---|---|---|---|
| 6,072,144 A | 6/2000 | Perryman | |
| 6,297,467 B1 * | 10/2001 | Maev | G01N 29/228 219/109 |
| 6,546,803 B1 | 4/2003 | Ptchelintsev et al. | |
| 6,757,948 B2 | 7/2004 | Ptchelintsev et al. | |
| 7,132,617 B2 | 11/2006 | Lee et al. | |
| 7,516,022 B2 | 4/2009 | Lee et al. | |
| 7,775,415 B2 | 8/2010 | Maev et al. | |
| 7,789,286 B2 | 9/2010 | Maev et al. | |
| 8,381,591 B2 * | 2/2013 | Maev | G01N 29/221 73/588 |
| 9,296,062 B2 * | 3/2016 | Maev | B23K 20/10 |
| 11,994,496 B2 | 5/2024 | Ghaffari et al. | |
| 2006/0076321 A1 * | 4/2006 | Maev | G01N 29/223 219/109 |
| 2010/0242608 A1 * | 9/2010 | Maev | G01N 29/28 73/588 |
| 2017/0021446 A1 * | 1/2017 | Maev | B23K 11/25 |
| 2023/0030196 A1 | 2/2023 | Jung et al. | |

FOREIGN PATENT DOCUMENTS

| | | | | |
|---|---|---|---|---|
| FR | 3009090 A1 | 1/2015 | | |
| WO | WO-2012120351 A1 * | 9/2012 | ........... | B23K 11/115 |

* cited by examiner

ULTRASONIC MICRO-ARRAY IMAGING SYSTEM

BACKGROUND

Resistance welding makes use of two conducting electrodes to pass a current through a stack-up that consists of two or more metal plates, or similar objects, such as a metal plate and a metal stud or nut/bolt. As the electrical current passes through the material, it generates heat through joule heating, which results in softening and eventually melting of the metal. The electrical current can be generated using a variety of methods such as transformers, capacitive discharge etc. Depending on the electrical current applied, the time of application, force applied to hold the plates and other conditions, such as surface quality, the quality of the joint can be influenced in a manner that results in poor structural performance. For this reason, a variety of monitoring systems have been developed using both ultrasonic means and resistance monitoring.

Presently, a large, monolithic transducer is employed as both a transmitter and receiver built into the welding electrode. When pulsed, the emitted wave is approximately a plane wave, which is focused by a lensing cap to a point-like measurement at the center of the plates being welded, offering an axial measurement. This arrangement offers a strong signal-to-noise ratio but is limited by the fact that only measurement along the center of the weld occurs, preventing direct information about the parameters outside of the center of the weld structure.

SUMMARY

A spot-welding electrode assembly includes an electrode, an electrode cap at an outer end of the electrode, and a plurality of transducers positioned inward of the electrode cap. The plurality of transducers may be micro-elements each having a length and a width that are each approximately ten times the wavelength of the ultrasonic wave or less. In one embodiment, each of the micro-elements has a length and width each approximately equal to five wavelengths or less. In another embodiment, the length and the width of each micro-element is approximately equal to the wavelength of the ultrasonic wave. The length and width of each micro-element may also be approximately equal to or less than one-half the wavelength.

The micro-elements may be positioned within the electrode or behind the electrode cap. An inner surface of the electrode cap may be concave. The concave inner surface of the electrode cap may be configured to act as a lens for the ultrasonic waves generated by the micro-elements.

A liquid may be disposed within the electrode cap. The micro-elements may be positioned in the liquid.

The micro-elements may be arranged in an array. The micro-elements may be coplanar.

The inner surface of the electrode cap may be configured to focus the wave from each of the micro-elements to a point within a work area adjacent an outer surface of the electrode cap.

The spot-welding electrode assembly may be included in a spot-welding system that further includes a computer programmed to analyze the waves from each of the micro-elements to monitor a weld made by the spot welder and the electrode.

A method for monitoring a weld formed by a spot-welder is also described herein. The method includes the step of passing current from an electrode through a stack-up, transmitting an ultrasonic wave from a plurality of sources in the electrode to a plurality of spaced-apart points in the stack-up, and monitoring the ultrasonic wave after it encounters boundaries in the stack-up.

The steps of transmitting and monitoring may be performed in-line, i.e. during the step of passing current from the electrode.

The steps of transmitting and monitoring may be performed multiple times for each of the plurality of sources during the welding process.

Each of the plurality of sources may send the ultrasonic wave to one of a plurality of points spaced from one another in the stack-up.

The ultrasonic waves may be transmitted through an electrode cap of the electrode. The ultrasonic waves from each of the plurality of sources may be directed to a different one of the plurality of points by a concave inner surface of the electrode cap. The ultrasonic wave may pass through the stack-up and experiences partial reflections from various interfaces of the weld. The arrival times of different reflections and/or transmissions may be registered by a computer and analyzed. A geometric measure of a nugget may be generated at different moments during welding, and the geometric measure may include three dimensions of the weld in a liquid state and in a solid state at different moments in time.

DETAILED DESCRIPTION

Figure 1:
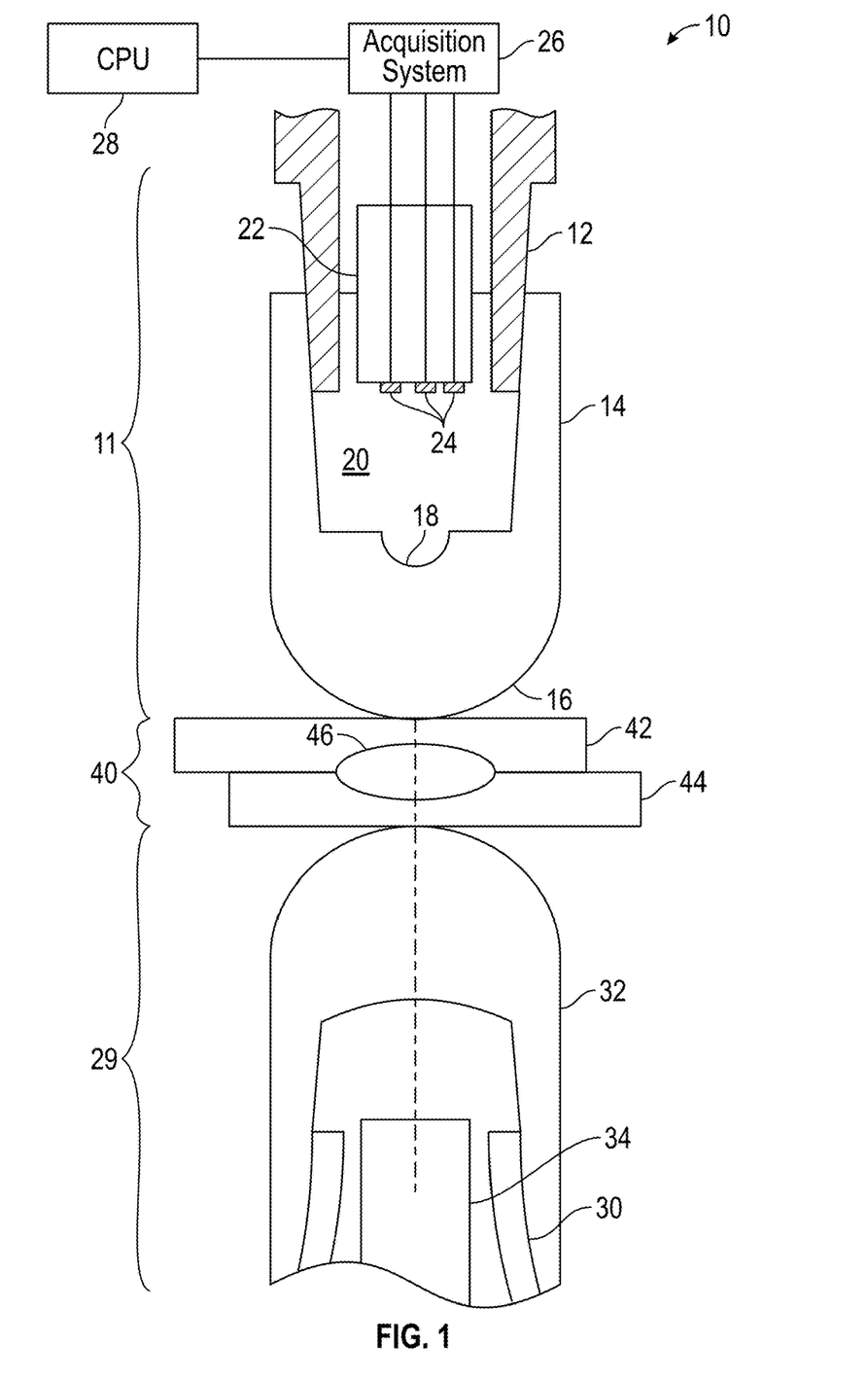
FIG. 1 is a schematic of one example of a welding system.

FIG. 1 schematically shows a spot-welding system 10 according to one example. The spot-welding system 10 includes a first electrode assembly 11 including an electrode 12 having a first electrode cap 14 which is a front wall of the first electrode assembly 11. The first electrode cap 14 may have a convex outer surface 16, or an outer surface having a convex portion. The first electrode cap 14 also has an inner surface, a portion of which is a concave inner surface 18. An interior bore 20 of the first electrode assembly 11 is defined inwardly of the concave inner surface 18. A liquid (e.g. water) fills the interior bore 20.

A transducer housing 22 is mounted within the electrode 12. In this example, the transducer housing 22 has a plurality of micro-elements 24 (shown out of scale for illustration) mounted thereto within the electrode 12 and within the electrode assembly 11. The micro-elements 24 are mounted within the electrode assembly 11 behind the front wall of the first electrode assembly 11, which in this embodiment is provided by the first electrode cap 12.

The micro-elements 24 are each ultrasound transducers capable of transmitting and receiving ultrasound waves through the liquid in the bore 20 and through the first electrode cap 14. In this application, the term "micro-element" means that the length and width of the element are each less than or equal to approximately ten times one wavelength of the wave (e.g. ultrasonic wave) to be transmitted by the element. The width and length of each of the micro-elements is defined in a plane of an outer surface of the each of the micro-elements, i.e. in a plane perpendicular to the direction of travel of the ultrasonic wave. In one embodiment, each of the micro-elements has a length and width each approximately equal to five wavelengths or less. In another embodiment, the length and width of the micro-element are approximately equal to the wavelength. The length and width of each micro-element may also be approximately equal to or less than one-half the wavelength.

An ultrasound acquisition system 26 may have a transmitting and receiving channel to connect to each of the micro-elements 24 directly as shown. The ultrasound acquisition system 26 connects to the each of the micro-elements 24 to pulse and receive sound from each micro-element 24 in a transmission, reflection, or combinational mode of imaging. The ultrasound acquisition system 26 may alternatively be a single-channel ultrasound module with one or more multiplexers for connecting to each of the micro-elements 24.

A weld controller 27 controls operation of the electrode 12 in a largely known manner. A CPU 28 controls the ultrasound acquisition system 26 and the weld controller 27. The CPU 28 receives the data from the micro-elements 24 and may alter the operation of the weld controller 27 based upon analysis of such data by the CPU 28.

FIG. 1 also shows a second electrode assembly 29 opposite the first electrode assembly 11. The second electrode assembly 29 includes a second electrode 30, which may have an electrode cap 32 and may optionally also include a transducer housing 34 with one or more transducer elements (not shown) mounted thereto.

As is known, a stack-up 40 is clamped between the first electrode 12 and the second electrode 30. In this example, the stack-up 40 includes a first workpiece 42 and a second workpiece 44. During the welding process, a liquid weld nugget 46 is formed. The formation, size and location of the liquid weld nugget 46 is measured by the ultrasound waves and monitored over time by the CPU 28.

The micro-elements 24 may transmit ultrasound waves and receive reflections of those ultrasound waves (or pulses of ultrasound) as they encounter the boundaries between the first workpiece 42, the liquid weld nugget 46, and the second workpiece 44. Alternatively, or additionally, the transducer housing 34 in the second electrode 30 may receive ultrasound waves transmitted by the micro-elements 24 in the first electrode assembly 11.

Figure 2A:
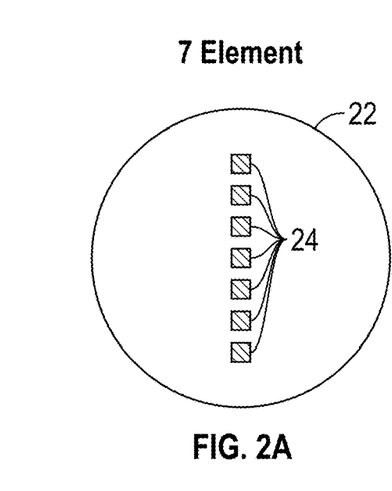
FIGS. 2A to 2H show various examples of arrangements for the micro-elements of FIG. 1.
Figure 2B:
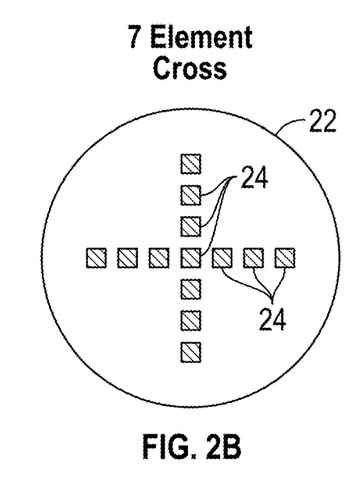
Figure 2C:
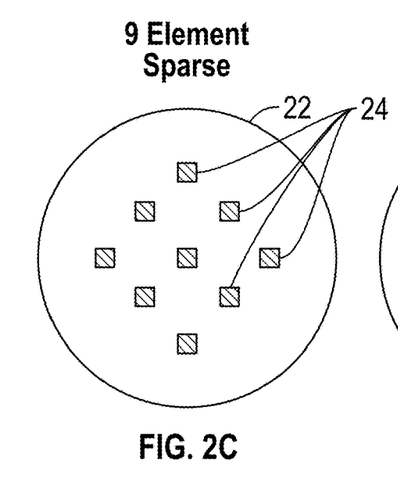
Figure 2D:
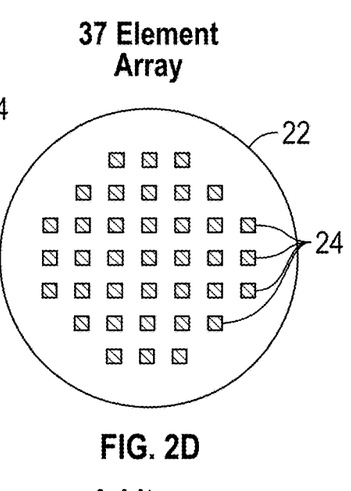
Figure 2E:
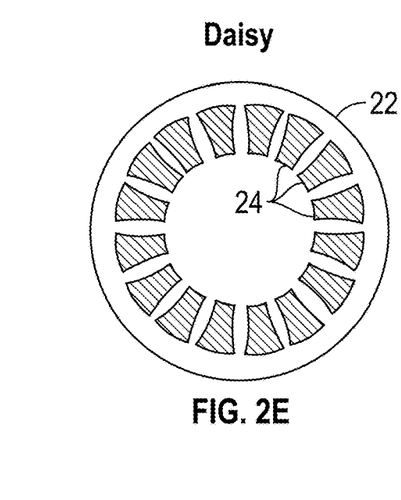
Figure 2F:
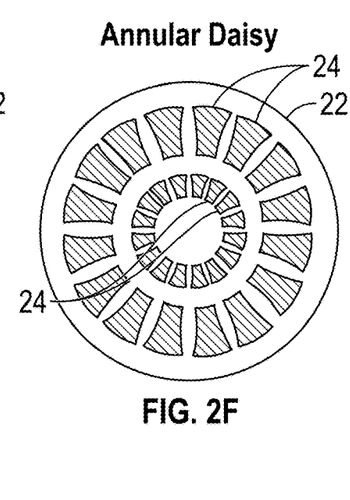
Figure 2G:
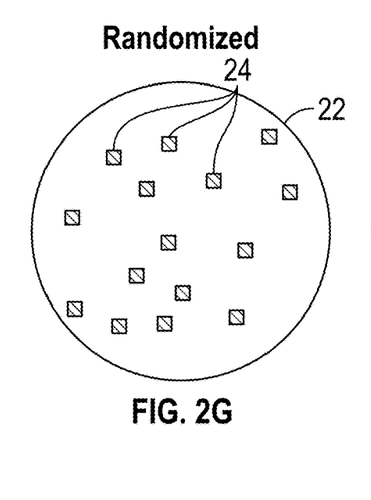
Figure 2H:
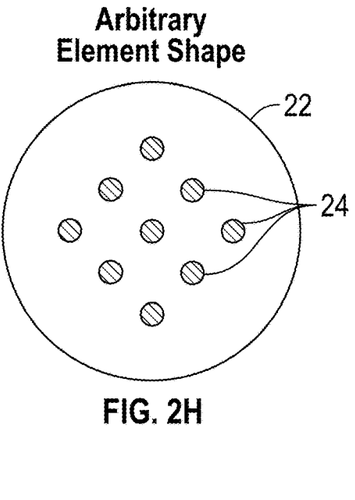

FIGS. 2A to 2H show several possible arrangements of the micro-elements 24. In the example of FIG. 2A, a linear array of micro elements 24 could be used to take a cross sectional measurement of weld quality. FIG. 2B shows the micro-elements 24 arranged in a cross pattern. FIG. 2C shows nine micro-elements 24 in a three-by-three array in which the micro-elements 24 are rotated relative to the array. FIG. 2D shows an example arrangement in which thirty-seven micro-elements 24 are arranged in seven even rows increasing in number from three to seven and then back down to three. FIG. 2E shows an example transducer housing 22 in which the micro-elements 24 are arranged in a "daisy" pattern or in an annular pattern (and the micro-elements 24 are shaped differently). FIG. 2F shows an example transducer housing 22 in which the micro-elements 24 are arranged in an "annular daisy" or dual annular pattern. As shown in FIG. 2G, the micro-elements 24 could also be arranged on the transducer housing 22 in a purely random arrangement, although the location of the micro-elements 24 may be calibrated prior to use. As the example in FIG. 2H shows, the micro-elements 24 could also be different shapes, such as round.

Alternatively, any other arrangement could be used consisting of point-source-like micro-elements 24 to allow for monitoring in two or three dimensions as well, in addition to monitoring over time (i.e. three or four dimensions). Additionally, a curved, three-dimensional arrangement of such micro-elements 24 could be used, e.g., if the front surface of the transducer housing 22 were convex or concave.

Figure 3:
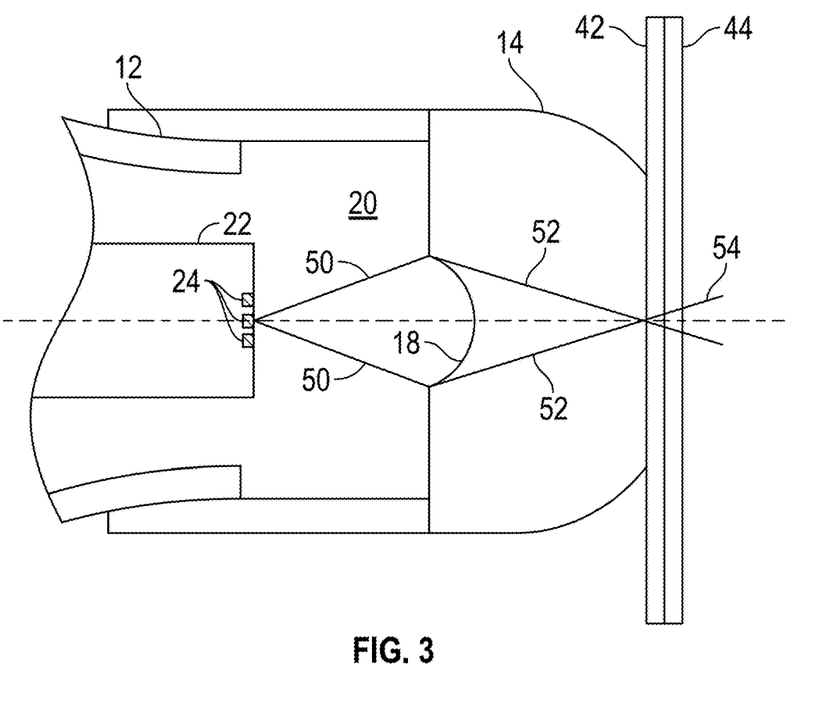
FIG. 3 is a section view through the first electrode assembly and stack-up of FIG. 1, illustrating the ultrasonic wave from a center micro-element.

FIG. 3 shows the first electrode cap 14 engaging the first workpiece 42 and the second workpiece 44. During welding, the emitted sound from each micro-element 24 results in a diverging ultrasonic wave 50 incident on the concave inner surface 18 at the interface between the cooling water stream and the electrode cap 14. In FIG. 3, the diverging ultrasonic wave 50 is shown emanating from the center of the three micro-elements 24 (only three shown for purposes of illustration). The lensing structure created by the concave inner surface 18 of the first electrode cap 14 acts to focus this divergent ultrasonic wave 50 such that it forms a converging ultrasonic wave 52 within the first electrode cap 14 and then focuses on a single region 54 (e.g. a focal point) of space within the first workpiece 42 and second workpiece 44.

Figure 4:
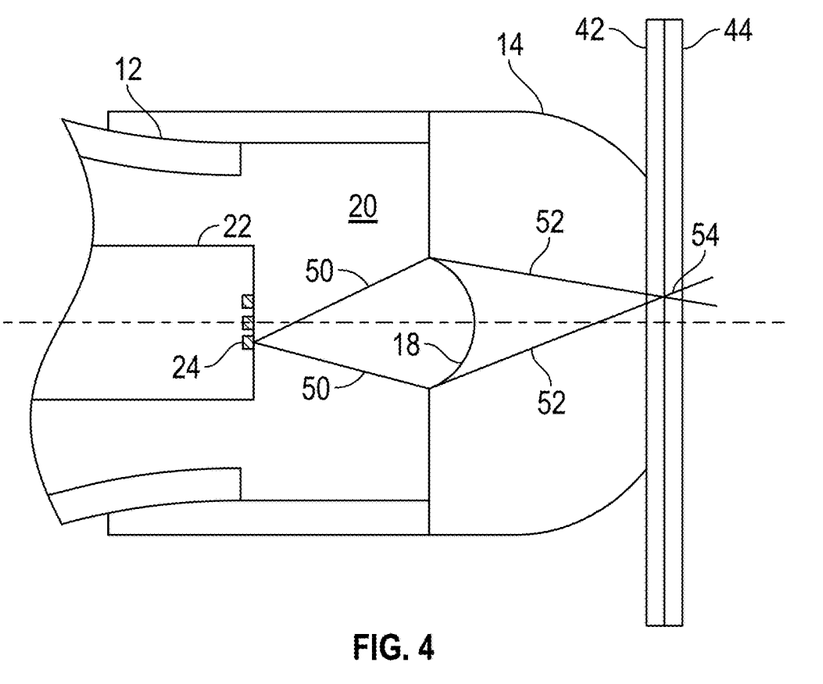
FIG. 4 is similar to FIG. 3 and shows the ultrasonic wave from a lower micro-element.

FIG. 4 again shows the diverging ultrasonic wave 50 emanating from the lower of the three micro-elements 24 (only "lower" in the drawing). The concave inner surface 18 of the first electrode cap 14 again focuses the divergent ultrasonic wave 50 such that it forms a converging ultrasonic wave 52 within the first electrode cap 14 and then focuses on a single region 54 (e.g. a focal point) of space within the first workpiece 42 and second workpiece 44. However, because the lower micro-element 24 is offset from the center micro-element 24 (e.g. by approximately 0.5 mm to 2.0 mm, although the distance is dependent on the geometry of the first electrode cap 14), the lens formed by the concave inner surface 18 of the first electrode cap 14 creates a focal point (i.e. the single region 54) that is offset upward from the focal point of the center micro-element 24.

Figure 5:
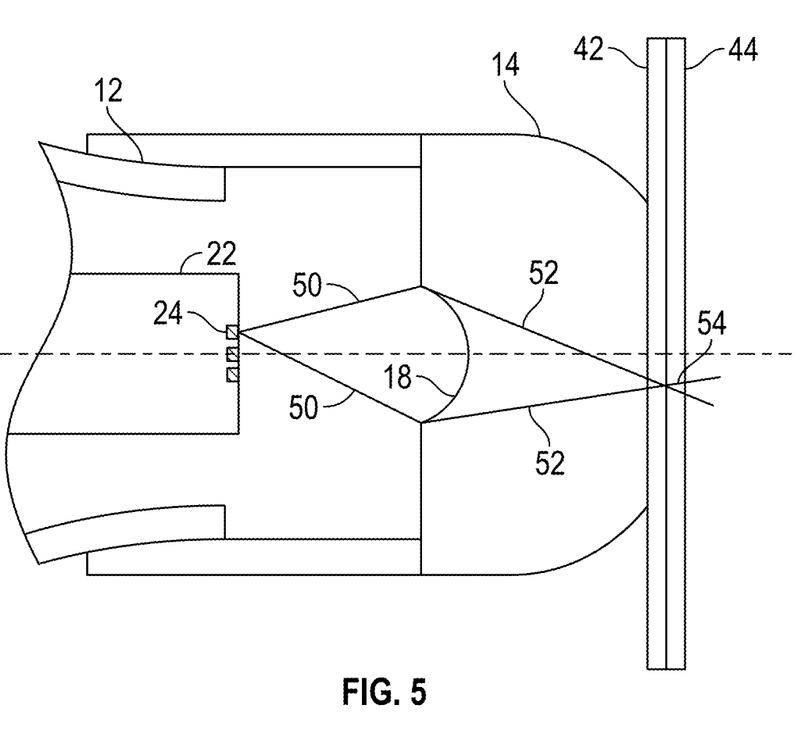
FIG. 5 is similar to FIG. 3 and shows the ultrasonic wave from an upper micro-element.

FIG. 5 shows the diverging ultrasonic wave 50 emanating from the upper one of the three micro-elements 24 (only "upper" in the drawing). The concave inner surface 18 of the first electrode cap 14 again focuses the divergent ultrasonic wave 50 such that it forms a converging ultrasonic wave 52 within the first electrode cap 14 and then focuses on a single region 54 (e.g. a focal point) of space within the first workpiece 42 and second workpiece 44. However because the lower micro-element 24 is offset from the center micro-element 24 (e.g. by approximately 0.5 mm to 2.0 mm, although the distance is dependent on the geometry of the first electrode cap 14), the lens formed by the concave inner surface 18 of the first electrode cap 14 creates a focal point (i.e. the single region 54) that is offset upward from the focal point of the center micro-element 24.

The micro-elements 24 are thus operated sequentially during the welding process, but quickly enough relative to the speed of the welding process that the scans from the plurality of micro-elements 24 are effectively simultaneous. The sequence can be repeated continuously throughout the welding process to monitor the formation of the weld over the entire welding process.

Alternatively, because the sound fields are focused, all micro-elements 24 could be operated in parallel with parallel hardware. If all micro-elements 24 were operated in parallel single, instantaneous snapshot could be taken.

As the waves focus to each region 54, reflections and transmissions from each surface in the stack-up 40 result in a metric that can be used for weld parameter measurement, and subsequent evaluation of quality using the phase and amplitude of the reflected and transmitted ultrasound wave. These reflections and transmissions form what is known as an A-scan, or time amplitude signal for each element. A series of A-scans can also be composed into a B-scan, which shows the evolution of each A-scan at a specific point in time.

These ultrasonic A-scans are acquired in a similar manner for each element in the array, with each acting as an individual acquisition from a specific region in space. If temporal evolution of the weld is desired, the process can be repeated in a manner to allow for multiple, in process quality measurements at differing regions of the weld.

By analyzing individual A-scans at each point in time, or the temporal evolution of A-scans from each element, a computer processing device can make a decision about the overall or instantaneous geometry and quality of the weld, in addition to its evolution, allowing a quality metric to be formed.

This is done by relying on the key changes to each reflection, mainly, the amplitude, phase, time of flight and disappearance or appearance of certain reflections within the weld structure that are indicative of the impedance mismatch and temperature of the overall structure.

During the welding process, a single element from the micro-array transmits sound as a point source which can be focused by a lensing system built into the welding electrode to a new point in space, in this case a point along the weld surface. This allows for each element to monitor a specific region of the weld formation, allowing for a quality estimation at any point during or after the welding process by observing the reflected wave using the same element, or a transmitted wave using a second element on the opposite side.

In addition to a single, two or three-dimensional measurement, multiple measurements of the weld can occur at each point in time, generating a temporal, multi-dimensional measurement of weld quality which would also allow for monitoring and feedback to the welding process using these metrics.

Figure 6:
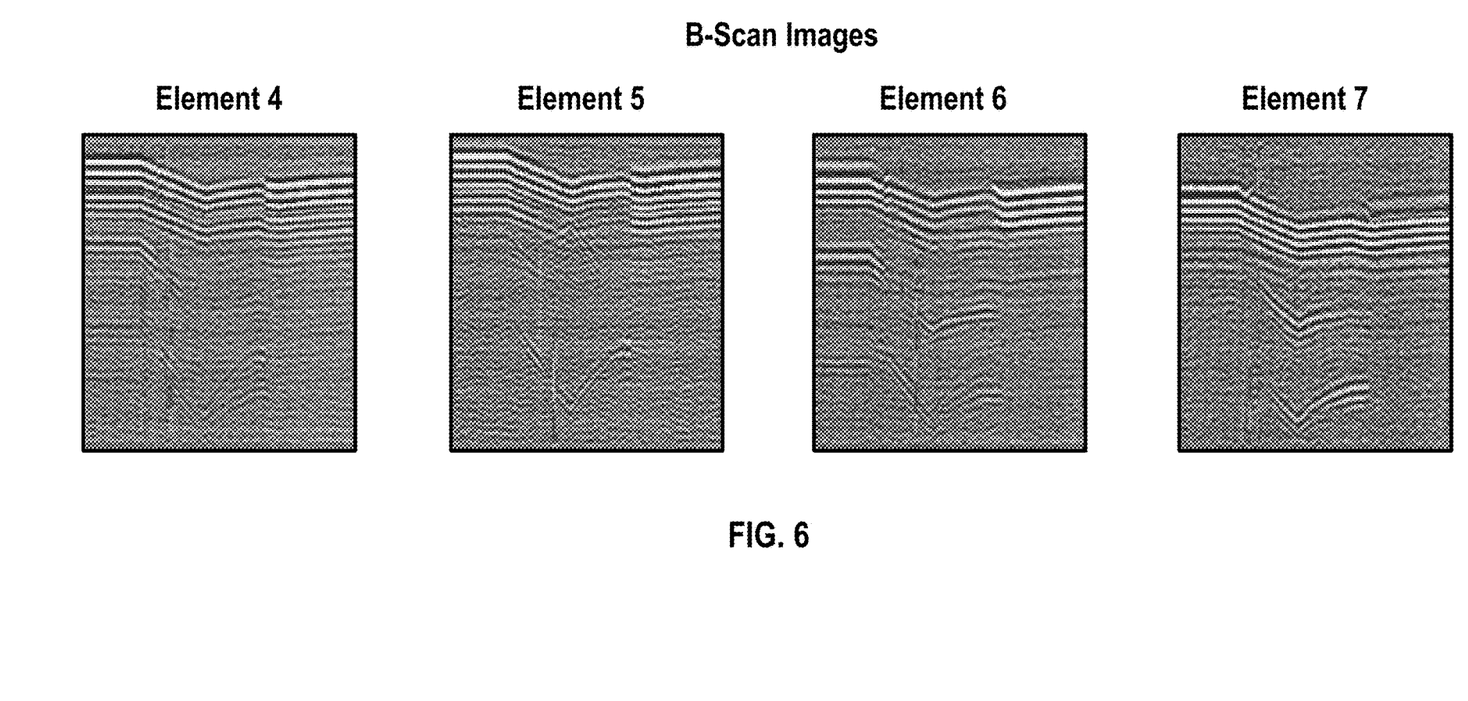
FIG. 6 shows a B-scan from each of a plurality of micro-elements.

FIG. 6 shows a B-scan from each of a plurality of micro-elements from any of the embodiments described above.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers on method steps do not signify a required sequence of performance of the method steps unless otherwise specifically recited in that claim.

What is claimed is:

1. A spot-welding electrode assembly comprising:
   an electrode inward of a front wall of the electrode assembly; and
   a plurality of transducer elements positioned inward of the front wall of the electrode assembly.

2. The spot-welding electrode assembly of claim 1 wherein an electrode cap is mounted at an outer end of the electrode and wherein the front wall is a portion of the electrode cap.

3. The spot-welding electrode assembly of claim 2 wherein the plurality of transducer elements is a plurality of micro-elements each configured to generate a wave having a wavelength, and wherein each of the plurality of micro-elements has a length and a width each equal to or less than approximately ten times the wavelength.

4. The spot-welding electrode assembly of claim 3 wherein the plurality of micro-elements is a plurality of ultrasound transducers.

5. The spot-welding electrode assembly of claim 4 wherein the plurality of micro-elements are within the electrode cap.

6. The spot-welding electrode assembly of claim 5 wherein a portion of an inner surface of the electrode cap is concave.

7. The spot-welding electrode assembly of claim 6 further including a liquid within the electrode cap and wherein the plurality of micro-elements are in the liquid.

8. The spot-welding electrode assembly of claim 7 wherein the plurality of micro-elements are arranged in an array.

9. The spot-welding electrode assembly of claim 7 wherein the plurality of micro-elements are coplanar.

10. The spot-welding electrode assembly of claim 7 wherein the inner surface of the electrode cap is configured to focus the wave from each of the plurality of micro-elements to one of a plurality of points within a work area outward of an outer surface of the electrode cap.

11. A spot welder including the spot-welding electrode assembly of claim 1 further including a computer programmed to analyze waves from each of the plurality of transducer elements to monitor a weld made by the spot welder and the electrode.

12. A spot-welding electrode assembly comprising:
   an electrode; and
   a plurality of transducer elements positioned inward of a front wall of the electrode assembly, wherein the plurality of transducer elements includes a plurality of micro-elements and wherein each of the plurality of micro-elements is configured to generate a wave having a wavelength approximately equal to a length and to a width of each micro-element.

13. A spot-welding electrode assembly comprising:
   an electrode; and
   a plurality of transducer elements positioned inward of a front wall of the electrode assembly, wherein the plurality of transducer elements is a plurality of micro-elements each configured to generate a wave having a wavelength, and wherein each of the plurality of micro-elements has a length and a width each equal to or less than approximately ten times the wavelength.

14. The spot-welding electrode assembly of claim 13 wherein the wavelength is approximately equal to the length and the width of each of the plurality of micro-elements.

15. A method for monitoring a weld formed by a spot-welder including:
   a) passing current from an electrode assembly through a stack-up;
   b) transmitting an ultrasonic wave from each of a plurality of sources in the electrode assembly toward a plurality of points in the stack-up; and
   c) monitoring the ultrasonic waves after step b).

16. The method of claim 15 wherein step c) is performed on the ultrasonic waves after the ultrasonic waves are reflected from boundaries in the stack-up.

17. The method of claim 15 wherein steps b)-c) are performed during step a).

18. The method of claim 17 wherein steps b)-c) are performed multiple times for each of the plurality of sources during step a).

19. The method of claim 15 wherein each of the plurality of sources sends the ultrasonic wave to one of a plurality of points spaced from one another in the stack-up.

20. The method of claim 19 wherein the ultrasonic wave is transmitted through an electrode cap of the electrode assembly in step b).

21. The method of claim 20 wherein the ultrasonic wave from each of the plurality of sources is directed to a different one of the plurality of points by a concave inner surface of the electrode cap.

22. The method of claim 21 wherein the ultrasonic wave passes through the stack-up and experiences partial reflections from various interfaces of the weld.

23. The method of claim 22 wherein arrival times of different reflections and/or transmissions are registered by a computer.

24. The method of claim 22 wherein a geometric measure of a nugget is generated at different moments during step a), wherein the geometric measure includes three dimensions of the weld in a liquid state and in a solid state at different moments in time.

25. The spot-welding electrode assembly of claim 1 wherein the plurality of transducer elements are arranged in an array.

26. The spot-welding electrode assembly of claim 1 wherein the plurality of transducer elements are coplanar in a plane perpendicular to a direction of travel of an ultrasonic wave from the plurality of transducer elements.

27. The spot-welding electrode assembly of claim 1 wherein an inner surface of the front wall is configured to focus a wave from each of the plurality of transducer elements to one of a plurality of points within a work area outward of an outer surface of the front wall.

28. The spot-welding electrode assembly of claim 1 wherein the plurality of transducer elements include nine transducer elements.

29. A spot welder including the spot-welding electrode assembly of claim 1 further including a computer programmed to analyze waves from each of the plurality of transducer elements to monitor in three dimensions a weld made by the spot welder and the electrode in a liquid state and in a solid state.

* * * * *